Dec. 7, 1943.       R. A. GOEPFRICH       2,336,352
                        BRAKE
            Filed June 5, 1940       2 Sheets-Sheet 1
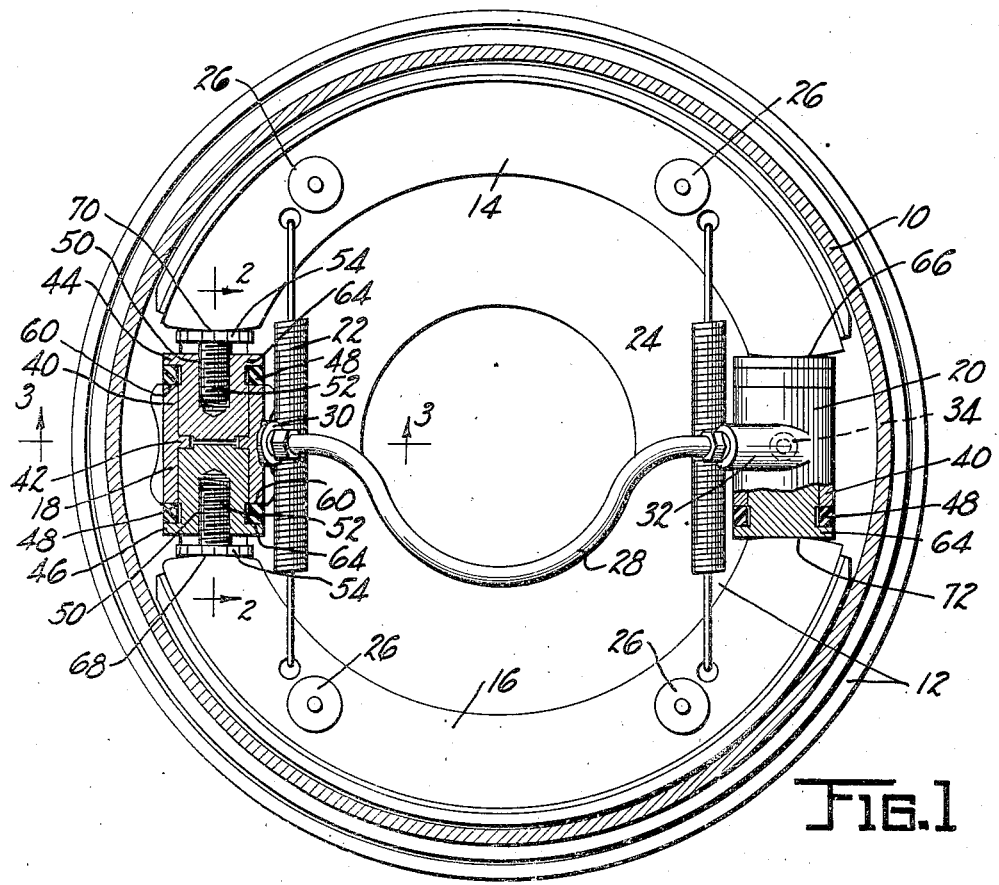
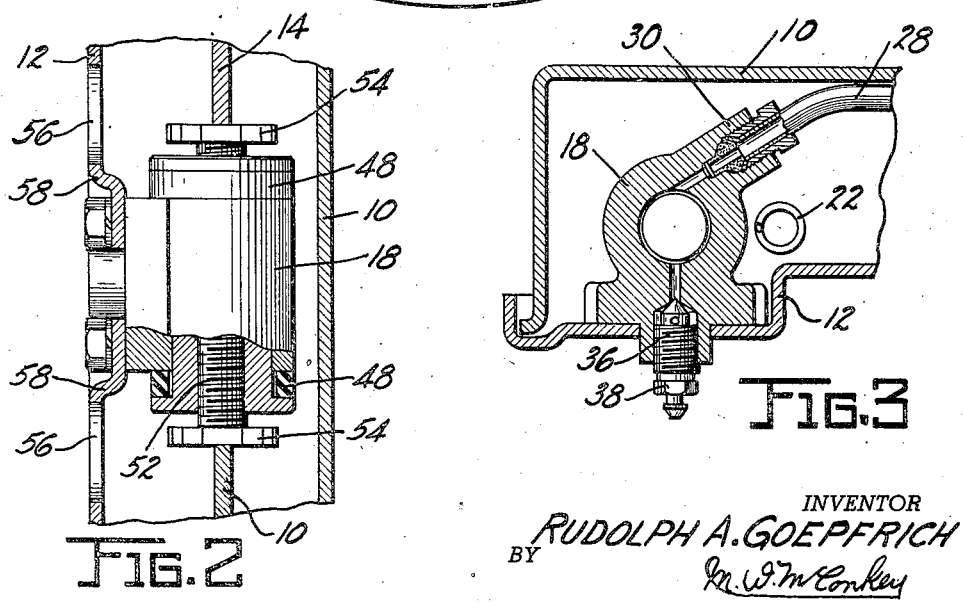
INVENTOR
RUDOLPH A. GOEPFRICH
BY
M. W. McConkey
ATTORNEY Dec. 7, 1943.    R. A. GOEPFRICH    2,336,352
BRAKE
Filed June 5, 1940    2 Sheets-Sheet 2

INVENTOR
RUDOLPH A. GOEPFRICH
BY
　　Ira W. McConkey
ATTORNEY

Patented Dec. 7, 1943

2,336,352

UNITED STATES PATENT OFFICE 2,336,352

BRAKE

Rudolph A. Goepfrich, South Bend, Ind., assignor to Bendix Aviation Corporation, South Bend, Ind., a corporation of Delaware Application June 5, 1940, Serial No. 338,898

8 Claims. (Cl. 188—152)

This invention pertains to fluid pressure devices, and is illustrated as embodied in a cylinder of a hydraulic braking system.

It is the object of my invention to provide a hydraulic cylinder assembly which will be effective in operation and at the same time inexpensive in cost. To serve this two-fold purpose, I have developed a novel sealing means which is not subjected to wear caused by sliding along the cylinder walls and which has a positive and direct sealing effect.

Other objects and features of my invention will be apparent during the course of the following description, reference being had therein to the accompanying drawings, in which:

Figure 1 is a vertical section taken just inside the head of the brake drum, and showing the brake shoes and actuating cylinders of a type of wheel brake assembly;

Figure 2 is a view taken on the line 2—2 of Figure 1;

Figure 3 is a view taken on the line 3—3 of Figure 1;

Figure 4:
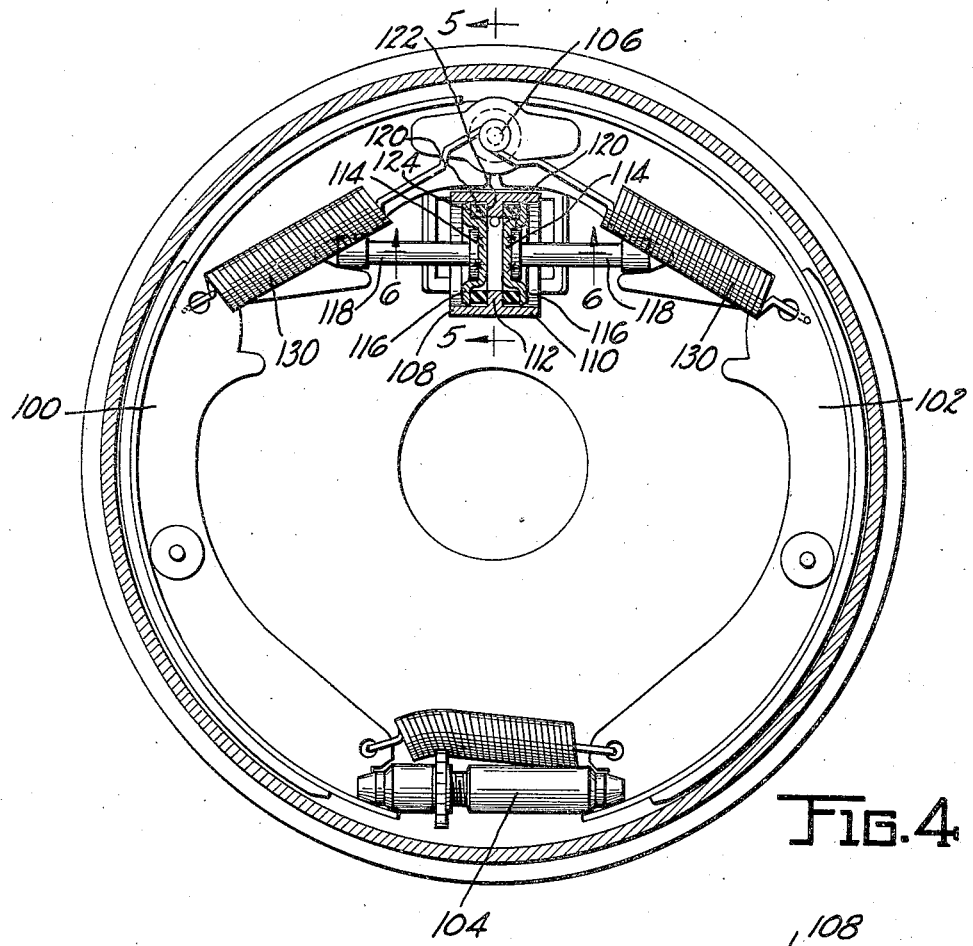
Figure 4 is a vertical section taken just inside the head of the drum, and showing a wheel brake assembly, the type different from that shown in Figure 1.

Referring now to the first modification of my invention, which is shown in Figures 1 to 3, the brake is of the type having two shoes which are individually shiftable to anchor at either end depending upon the direction of rotation of the brake drum.

The brake of Figure 1 comprises a rotatable brake drum 10, and a stationary brake applying unit which includes a backing plate 12, a pair of brake shoes 14 and 16 mounted on the backing plate, a pair of hydraulic wheel cylinders 18 and 20 secured to the backing plate and arranged to move the shoes into contact with the drum, and a pair of return springs 22 and 24 for moving the shoes to their original position when the brakes are released. Suitable steady rests 26 are provided for maintaining the shoes against excessive movement along the axis of the brake drum. The wheel cylinders 18 and 20 are connected to one another by a conduit 28 which leads from a port 30 in the cylinder 18 to a port 32 in the cylinder 20. A fluid inlet 34 is provided in the cylinder 20 and is connected by suitable means to the hydraulic master cylinder. A bleed inlet 36, in the cylinder 18, is threaded to receive a bleeder screw 38. It will therefore be apparent that pressure fluid from the hydraulic master cylinder and the conduits leading therefrom will first enter the cylinder 20 and will then pass through the conduit 28 to the cylinder 18.

The cylinder 18 comprises a cylinder wall 40 having an inwardly extending annular flange 42 at approximately the center thereof, and a pair of pistons 44 and 46. Each of the pistons is provided with an annular sealing element 48 rectangular in cross section and each of the pistons has an internally threaded recess 50 into which is screwed an adjusting element 52 having at the outer end thereof a ratchet wheel 54. As can be more clearly seen in Figure 2 a pair of oblong openings 56 are provided in a pair of oblong depressions 58 in the backing plate to make possible adjustment of the brake shoes by manipulation of the ratchet wheels 54. The cylinder 20 is in all respects the same as the cylinder 18 except that no adjusting elements are associated with the pistons of cylinder 20. Each of the brake shoes contacts at one end one of the ratchet wheels of the cylinder 18, and contacts at the other end one of the pistons of the cylinder 20.

The two sealing elements 48 of the cylinder 18 and the two sealing elements of the cylinder 20 are each bonded or vulcanized along their respective surfaces 60 to the cylinder wall 40 and are each bonded or vulcanized along their respective surfaces 62 to a flange 64 on the edge of the associated piston.

When the brakes are in released position the inner ends of the pistons abut against the flange 42 and are anchored there. If now the brakes are applied in the usual manner pressure fluid is admitted to the cylinders 18 and 20 between the inner ends of the pistons in the said cylinders. The fluid forces the pistons apart spreading the shoes at both ends thereof. Depending upon the direction of rotation of the brake drum the shoes will individually anchor at one end. If the rotation of the brake drum is clockwise the shoe 14 anchors at 66 against the adjacent piston of the cylinder 20, the piston in turn anchoring against the annular flange in the cylinder 20 which corresponds to the flange 42 of the cylinder 18. At the same time the shoe 16 anchors at 68 on the ratchet wheel 54 and the braking torque is transferred through the ratchet wheel and the piston 44 to the flange 42. If the direction of rotation of the drum is counterclockwise the shoe 14 anchors at 70 while the shoe 16 anchors at 72. Brake applying movement of any of the four pistons places the associated sealing element 48 under tension. The sealing elements are made of some suitable resilient substance, such as rubber or neoprene, and are therefore stretched by the applying movement of the cylinder. This stretching is accomplished without destroying the bond between the sealing element and the piston flange and between the sealing element and the cylinder wall. When the piston returns to its normal position the resilient sealing element assumes its original shape. It will be noted that the sealing is positive inasmuch as it does not depend upon the pressure of the brake applying fluid and that there is no sliding of the sealing element along the cylinder wall or tendency for that element to be pinched between the cylinder wall and the piston. The elimination of the danger of pinching the sealing element makes it possible to use a cylinder and piston machined less carefully than has heretofore been the case.

Figures 5, 6:
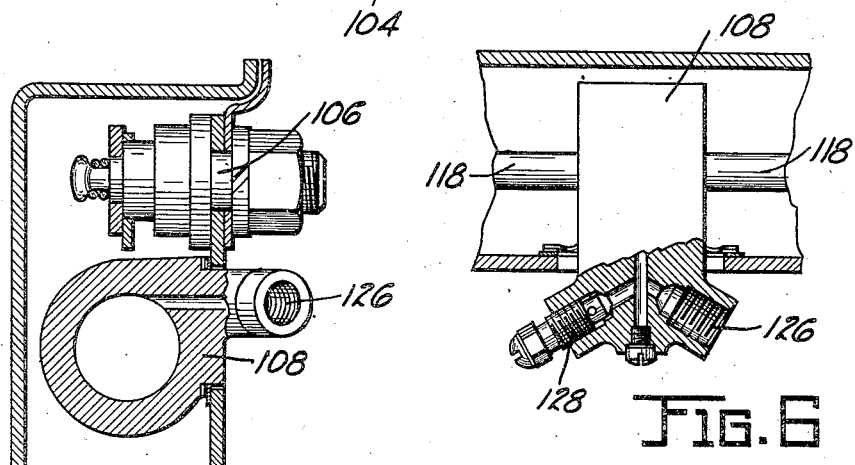
Figure 5 is a section taken on the line 5—5 of Figure 4.
Figure 6 is a section taken on the line 6—6 of Figure 4.

The brake of Figure 4 is a brake of the shiftable anchorage type comprising a pair of brake shoes 100 and 102, an adjustable link 104 between the shoes at one end thereof, an anchor 106 between the shoes at the other end thereof and a hydraulic actuator 108 adjacent the anchor and arranged to spread the shoes. The hydraulic actuator 108 comprises a cylindrical wall 110 having an annular inwardly extending flange 112, a pair of stamped piston elements 114 each having an outwardly flaring flange 116. A pair of rods or plungers 118 are welded, as indicated by the crosses on the drawing, to the outer surfaces of the piston elements 114. These rods or plungers 118 contact at their outer ends the webs of the shoes 100 and 102. Sealing elements 120 are bonded to the cylinder flange 112 at 122 and to the piston flange 116 at 124. As shown in Figures 5 and 6 the hydraulic actuator 108 is provided with a fluid inlet 126 and with a bleed opening 128. Pressure fluid entering the cylinder through the inlet 126 spreads the piston elements 114, moving the rods 118 to apply the shoes 100 and 102 to the brake drum. Depending upon the direction of rotation of the brake drum either shoe 100 or shoe 102 will anchor against the anchor member 106. Return springs 130 are provided for returning the shoes to brake released position.

As in the brake of Figure 1, applying movement of the piston elements stretches or puts under tension the sealing elements 120. The resiliency of the said elements 120 allows them to stretch during brake applying movement and to return to their normal shape when the brakes are released.

While I have described a pair of specific embodiments of my invention it is to be understood that other uses of my device are contemplated, and it is intended that the scope of my invention be not limited otherwise than by the terms of the appended claims.

I claim:

1. A brake comprising a pair of connected shoes, an anchor adjacent the ends of said shoes, a hydraulic cylinder between the shoes adjacent the anchor having an internal inwardly extending flange at approximately the center thereof, a pair of piston elements in the cylinder, connections between the piston elements and the shoes, and resilient sealing means bonded to the piston elements and to the cylinder flange and under tension during shoe spreading movement of the piston elements.

2. A brake having a pair of shoes which are individually shiftable to anchor at either end, a pair of hydraulic cylinders between the ends of the shoes each having an inwardly extending anchor flange located near its center, a pair of pistons in each of the cylinders adapted to anchor at times on the flange, and sealing means bonded to the pistons and to the annular end surfaces of the cylinders and under tension during shoe spreading movement of the pistons.

3. A hydraulic actuator comprising a cylinder wall having an inwardly extending flange located substantially centrally therein, a pair of pistons movable within said wall and having portions outside of said wall and of greater diameter than the interior of said cylinder wall, and a pair of resilient elements bonded to the cylinder wall and to the pistons and under tension during movement of the pistons relative to the cylinder wall.

4. A hydraulic actuator comprising a cylinder wall having an internal flange, a piston anchoring at times against said flange and having a portion of greater diameter than the interior of the cylinder wall, and a resilient sealing element bonded to the cylinder wall and bonded to the said portion of the piston and under tension during movement of the piston relative to the cylinder wall.

5. A brake comprising a hydraulic cylinder, an anchor near the cylinder, a shoe which may be actuated by pressure in the hydraulic cylinder applied at the end of the shoe and which may transmit applying torque to the anchor through the same end which the hydraulic cylinder may apply, an inwardly extending flange near the center of the hydraulic cylinder, a connection between the piston element and the shoe for exerting pressure on the shoe as described above, and resilient sealing means bonded to the piston element and to the cylinder flange and under tension during the shoe applying movement of the piston element.

6. A brake comprising a hydraulic cylinder, an anchor near the cylinder, a shoe which may be actuated by pressure in the hydraulic cylinder applied at the end of the shoe and which may transmit applying torque to the anchor through the same end which the hydraulic cylinder may apply, an inwardly extending flange near the center of the hydraulic cylinder, a connection between the piston element and the shoe for exerting pressure on the shoe as described above, and resilient sealing means bonded to the piston element and to the cylinder flange.

7. A hydraulic actuator comprising a cylinder wall having an inwardly extending anchor flange located substantially centrally therein, a piston reciprocable within said wall and having a portion outside of said wall and of greater diameter than the interior of said cylinder wall, and a resilient element bonded to the annular end surface of the cylinder wall and to the annular inwardly facing surface of the shoulder formed at the junction of the greater diameter portion of the piston with the portion of the piston reciprocable in the cylinder, said resilient element being under tension during movement of the piston relative to the cylinder wall.

8. A brake comprising a friction element which is shiftable to anchor at either end according to the direction of drum rotation, an anchor for the friction element, a hydraulic cylinder having a piston therein operably connected with the friction element to actuate the same, and a resilient sealing element extending coaxially with the cylinder wall and bonded at one end to an annular outwardly facing surface formed as a part of the cylinder wall and at the other end to an annular inwardly facing flange formed as a part of the piston, said sealing element being under an increasing tension during movement of the piston in a direction to actuate the friction element.

RUDOLPH A. GOEPFRICH.